United States Patent [19]

Lehmkuhl

[11] Patent Number: 4,612,831
[45] Date of Patent: Sep. 23, 1986

[54] AUTOMATIC BORING TOOL
[76] Inventor: Robert A. Lehmkuhl, 7 Klara Ct., Madison, N.J. 07940
[21] Appl. No.: 703,091
[22] Filed: Feb. 19, 1985
[51] Int. Cl.[4] ............................................. B23B 3/26
[52] U.S. Cl. ....................................... 82/1.4; 82/2 E; 408/3; 408/159
[58] Field of Search ...................... 408/1, 3, 4, 11, 12, 408/13, 157, 158, 159; 82/1.2, 2 E, 1.4

[56] References Cited
U.S. PATENT DOCUMENTS
3,749,508  7/1973  Schukrafft ........................ 408/159
4,432,258  2/1984  Currer .................................. 82/1.2
4,489,629  12/1984 D'Andrea et al. .................. 82/1.2

FOREIGN PATENT DOCUMENTS
2141054 12/1984  United Kingdom ................ 82/1.2

Primary Examiner—Z. R. Bilinsky
Attorney, Agent, or Firm—Edward J. Utz

[57] ABSTRACT

A boring machine having a tapered shank received in a spindle with a pre-loaded adjustable boring bar carrying said tapered shank and a non-rotating torque arm for controlling a pre-loaded adjustable boring bar pivotally secured to a tapered shank to pivot the boring bar.

5 Claims, 16 Drawing Figures

AUTOMATIC BORING TOOL

OBJECTIVES

The objective of my invention is to provide boring tools for machine tools that are capable of being automatically adjusted without operator intervention.

Another object of my invention is to control the boring tool with a compact machine mounted servo driven actuating device.

Another object of my invention is to provide a boring tool that can be configured for extreme accuracy for precision boring of critical holes.

Another object of my invention is to provide a boring tool that can be configured for sufficient adjustment range such that it can be used for taper boring or thread chasing.

Another object of my invention is to provide cutting tool stability by preloading all operating mechanisms in the housing tool operating body.

Another object of my invention is to provide a boring tool having integral mounted torque arm to work in conjunction with a compact machine mounted servo driven actuating device.

Another object of my invention is to provide for a tool present signal.

Another object of my invention is to provide for a positive operating connection between the boring tool torque arm and the machine mounted servo actuating device.

Another object of my invention is to provide an automatic adjustable boring tool that can be loaded in the machine spindle manually or by means of an automatic tool changer and retain orientation of torque arm while stored in the tool.

Another object of my invention is to control the machine mounted servo actuating device with a separate control system working in conjunction with electronic measuring device such as a machine mounted probe or off machine inspection instruments for the purpose of automatically adjusting the boring bar in fine increments to maintain hole tolerance.

Another object of my invention is to control the machine mounted servo actuating system with an axis of the machine computer numerical control for the purpose of automatic fine adjustment and also to control the boring tool simultaneously with the spindle feed axis in order to execute taper boring contouring or thread chasing.

GENERAL

In machine tools—manually adjusted boring tools are normally used. These are usually preset or set at the machine by the operator by using dial bore gages or other measuring devices. If hole diameter size exceeds the tolerance band then another manual setting procedure is employed. In some cases when automatically adjustable tools have been used it was necessary to adjust them in increments by using external devices during a cycle interuption procedure. Other automatically adjustable boring bars do not have sufficient range of adjustment to machine various contours or their acuating device is extremely large and expensive. Some of the automatic adjustable tools can not be handled by the machine automatic tool changer.

To overcome these performance and economic disadvantages I have provided an automatic adjustable boring tool consisting of a main operating body arranged to be retained in the taper of the machine spindle. A spring preloads the operating mechanism of the pendulum mounted boring bar. The bar is adjusted by means of a cam surface designed to provide the correct operating function of the bar such as fine boring or surface contouring. This cam surface works in conjunction with a cam bar that is actuated by a sliding sleeve connected to a torque arm by sealed bearings.

A spring loaded plunger operating internally in torque arm control stem is used to release an orientation retention latch while the boring tool is being inserted in the spindle and the control stem is advancing into a machine mounted acuating unit during an automatic or manual tool change.

A spring loaded tool present limit switch operating plunger has a stronger spring than the torque arm latch release plunger thereby delaying the tool present signal until the orientation latch is released and the boring bar is seated in the spindle taper.

The machine mounted actuating unit is mounted adjacent to the spindle bearing housing.

The actuating unit consist of a spring loaded balanced area hydraulic piston connected to a yoke for operating a positioning feedback transducer and travel limit switches. The hydraulic piston operates in a cylinder housing mounted to the machine and is controlled by a servo valve and a bypass valve. The piston assembly includes a tool present limit switch and a cam operated locking device to maintain a positive connection with the torque arm control stem during operation.

OPERATION

The main operating body of the boring tool is fitted with a boring bar having a very gradual cam surface. The angle of the cam surface versus the "length ratio" of the pedulum mounted boring bar determines the accuracy and increment of adjustment that can be made during boring. The length ratio of the bar is the distance from the cam surface to the pivot point divided by the distance from the pivot point to the tool tip. The distance from the cam surface to the pivot point is a variable but can be mathematically compensated for by the CNC softward or cam shape. For precision boring, a selected cam angle may provide for 0.00001" tool tip motion for each 0.0001" motion of the hydraulic piston and since the resolution for piston displace is normally 0.0001" a very fine adjustment can be made.

The selected bar will not only have the proper cam angle and ratio but also have the correct length and diameter to accomplish the desired boring operation. It should be noted that this design allows for boring holes over a large range of diameters and lengths.

After the selection and assembly of the correct bar and tool, the torque arm of the bar is positioned in its upper most position and retained there by spring loaded detent balls mounted in the sliding sleeve and operating in an internal groove of the main operating body. This position provides the smallest diameter the boring tool will machine. At this point the tool is usually preset with gages to the mean of the tolerance permitted. The tool is then either manually loaded or inserted by the machine automatic tool chamber into the machine spindle. Prior to this the hydraulic piston of the actuating device is fully retracted by the servo valve and the position is confirmed by the proper limit switch and the position transducer. The cam operation locking device of the piston assembly is in the released position and is maintained that way while the piston is retracted. The operating plunger for the tool present limit switch also maintains the locking device in the release position regardless of position unless the control stem for the torque arm of the boring bar has been inserted. Upon boring bar insertion in the spindle, orientation release plunger first is depressed by the tool present limit switch plunger, continued insertion causes the torque arm control stem to depress the tool present plunger which causes a tool present signal to occur. Before the boring operation takes place the hydraulic piston is extended a fixed amount. This distance is equal to the straight portion of the boring bar cam surface and is sufficient to allow the spring loaded clamping ring to lock a series of balls located in a series of holes in the piston extension sleeve rigidly in the external cam groove of the torque arm control stem. The clamp ring has an internal cam groove with a locking angle that prevents the balls from unseating while the piston is positioning the control stem of the torque arm during machining operations. The straight portion of boring bar cam surface prevents any change in boring tool position while the tool stem locking cycle occurs.

During operation the hole is bored and subsequently inspected by either a machine mounted probe or an off the machine inspection instrument. In the event the hole diameter falls below tolerance an adjustment is made by the servo valve moving the hydraulic piston the correct amount. This amount is the result of probe or inspection instrument information being processed by the control. The piston transducer varifies the correct piston position. The resultant effect of the piston motion is to have the torque arm move the cam bar by means of the sliding sleeve. The cam bar motion along the boring bar cam surface pivots the bar thus advancing the tool tip to the required position. This process can be repeated at programmed intervals until the production run is complete.

After the hole has been bored and the boring tool can be removed from the spindle, the hydraulic piston is fully retracted, pulling the control stem and torque arm assembly in the upper most position which causes it to be retained there by the spring loaded detent balls.

The piston motion also causes the spring loaded clamping ring to contact the cylinder body, the piston continues to move which allows the series of balls to enter an internal cam groove in the ring. As the boring tool is removed the tool present limit switch plunger follows the control stem out of the piston extention sleeve until it is in position in front of the balls preventing them from becoming disassembled from the piston assembly. An orientation retention latch is also engaged during boring tool removal.

After tool removal and during other machine operations the bore of the piston sleeve is kept clean by air pressure being directed to the area.

CONTOURING OR THREADING

The main operating body of the boring tool is fitted with a boring bar having a cam angle and length ration such that motion of the hydraulic piston will generally result in a larger displacement of the tool tip than is the case with fine boring. This increased tool tip motion allows for a broader range of contouring and threading. The accuracy required for these operations are generally not as great as for fine boring.

This type of tool is preset in the same manner as the boring tool previously described.

During contouring operations the hydraulic piston of the actuating device may be constantly changing position as the bar is fed into the hole by the spindle of Z axis. The rate of change of the piston position versus the rate of change of spindle position determines the shape of contoured holes. In this case the boring tool and the Z axis are controlled by a common control.

After each use of the tool the hydraulic piston is fully retracted, moving the torque arm assembly to the detented upper most position and release of the control stem as described earlier. The boring tool can now be stored and other machining operations performed.

SURFACE SENSING

The servo driven actuating device is designed to work in conjunction with this device is described in an application being Ser. No. 651,474 now U.S. Pat. No. 4,579,487 telescoping tool adapters arranged for the specific machining operations of drilling, tapping and milling.

The function of the tool adapter is to sense the location of the work surface, this provides means for the CNC control to measure tool depth without using preset tools or tool offsets. Tap feed rate control and broken tool detection are also a feature of this invention.

In operation the servo valve is centered and the bypass valve is opened allowing oil to move freely from one end of the balanced area hydraulic piston to the other. The spring load forces the piston assembly to the extended position.

The telescoping tool adapter is inserted in the spindle and the torque arm plunger of the adapter is inserted in the piston extension sleeve.

In the drawings the same reference numerals are used throughout the several views and refer to the same parts, and the sectional views are taken looking in the direction of the arrows at the ends of the section lines.

Referring now to the drawings.

Figure 1:
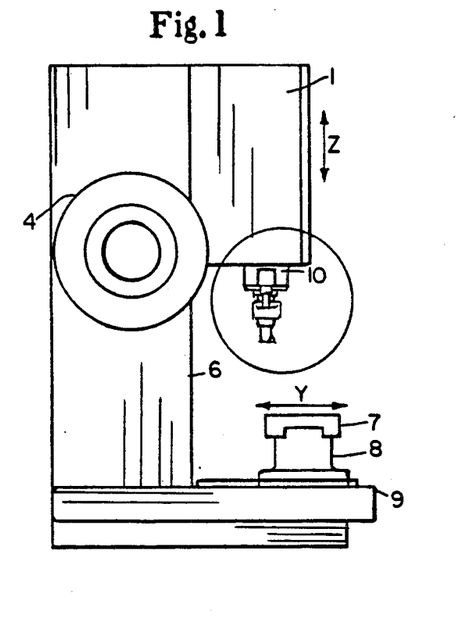
FIG. 1 is a side elevation of a machining center showing my invention inserted in the spindle.
Figure 2:
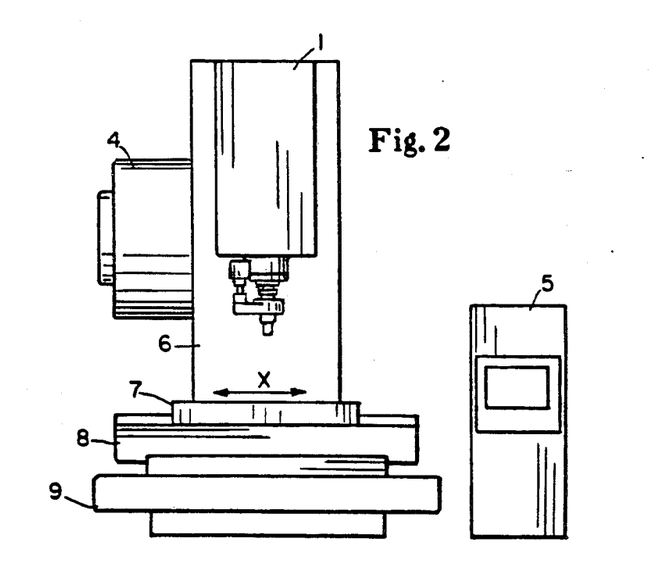
FIG. 2 is a front elevation of a machining center showing my invention from a different view.

Referring to the drawings, I show in FIGS. 1 and 2 a vertical spindle machining center having a base 9 supporting a moving saddle 8. The saddle motion is referred to as the Y axis. The saddle supports the workholding table 7. The table motion is referred to as the X axis. The base also supports the machine column 6. Mounted to column 6 is the automatic tool changer 4.

Figure 3:
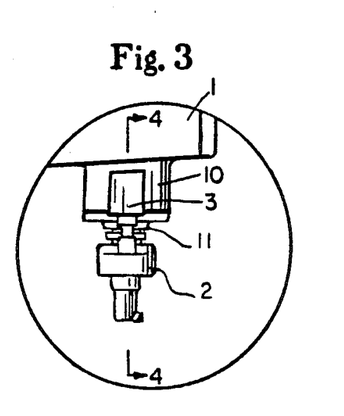
FIG. 3 is an enlarged view of the spindle area showing my invention in more detail.

Column 6 also provides a slidable mounting surface for the spindle headstock 1. The vertical motion of the headstock 1 is referred to as the Z axis. Referring now to FIG. 3, I show a spindle housing 10 at the lowering portion of headstock 1. Mounted to the spindle housing 10 is servo actuating unit 3. Automatic boring bar 2 is retained in spindle 11 and is engaged with actuating unit 3. Referring again to FIG. 2, I prefer to show a CNC control 5 as the controller for this application.

Figure 4:
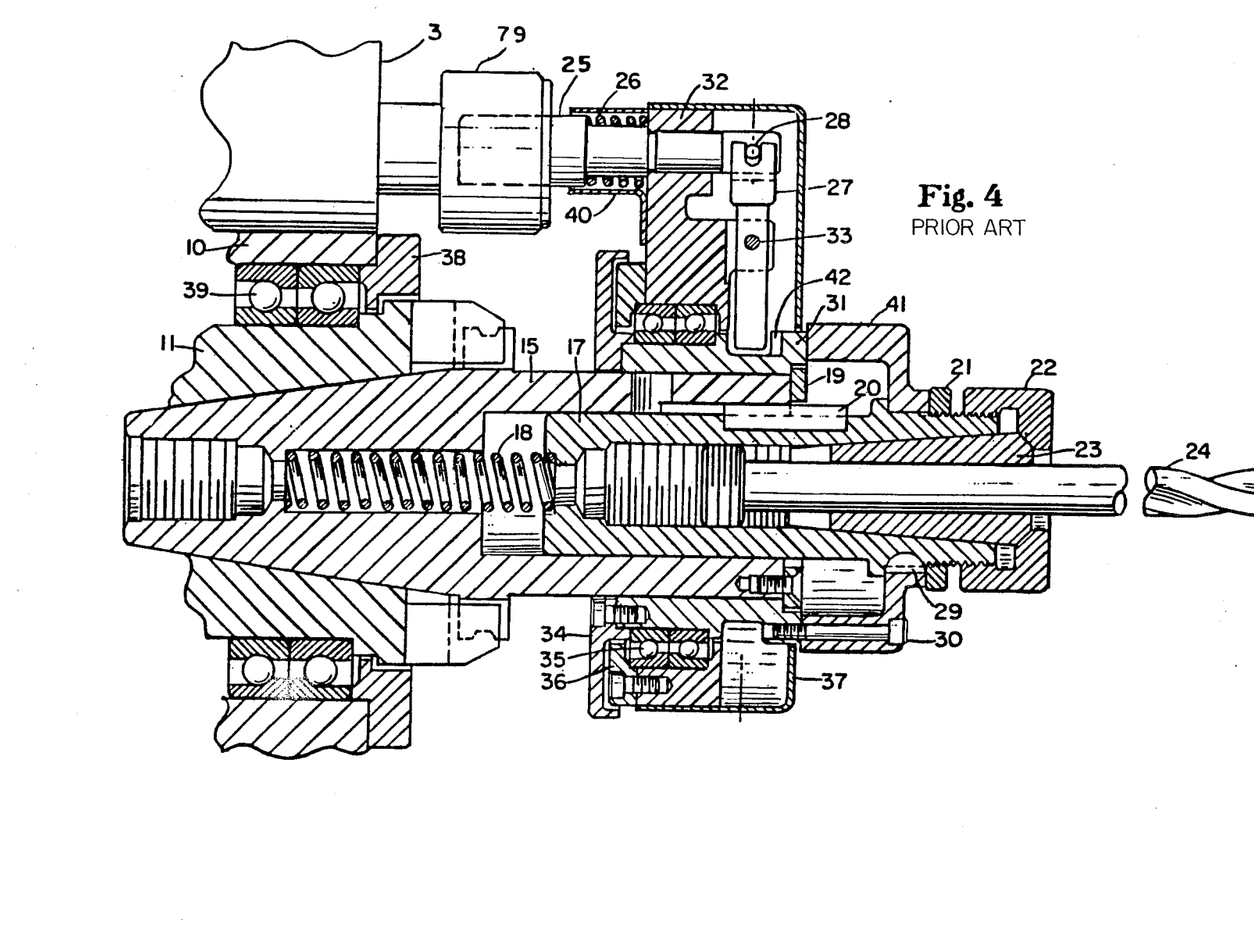
FIG. 4 is a section of the tool adapter portion taken along line 4—4 of FIG. 3.

Referring to FIG. 4 I show a section through a telescoping tool adapter arranged for drilling. In this drawing the plunger 25 has been modified to work in conjunction with actuating unit 3 instead of the transducer unit described in the afore mentioned invention. It should also be mentioned that the actuating unit 3 will also work in conjunction with the other tool adapters described in the afore mentioned invention.

Figure 5:
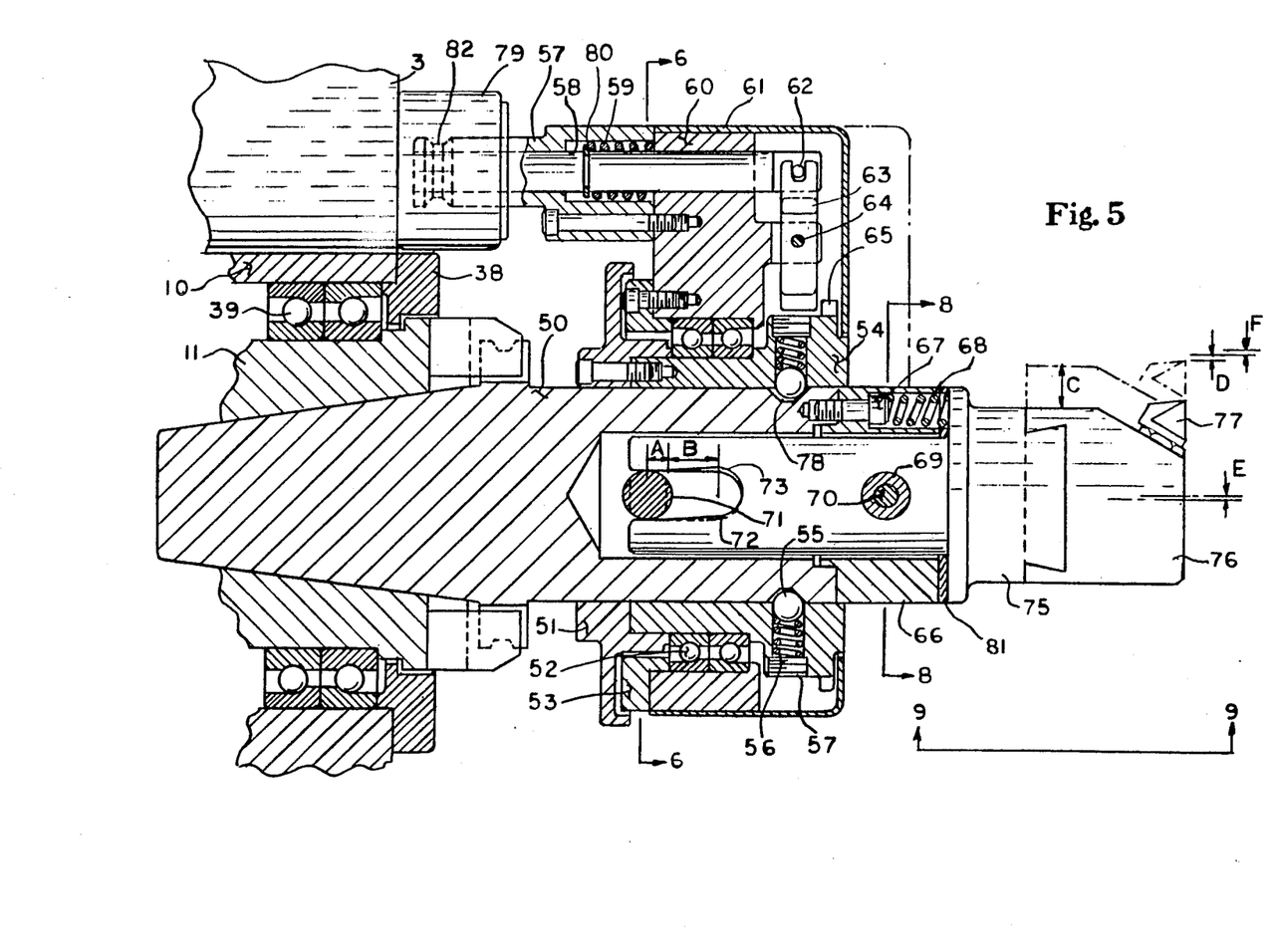
FIG. 5 is a section of the boring tool portion of my invention also taken along line 4—4 of FIG. 3 similar to FIG. 4.

In FIG. 5 I show a section through automatic boring tool 2 which consist of operating body 50 retained in spindle 11. Sliding sleeve 54 is slidably fitted to operating body 50 and is retained in a retracted position by detent balls 55, detent springs 56 and spring screw 57 working in operating body detent groove 78. Sliding sleeve 54 is arranged to control the position of the cam bar 71 by means of slot 85 (shown in FIG. 7) and bearing retainer 51. Slot 85 is wider than diameter of cam bar 71 which eliminates any alignment problem with fit of cam bar 71 in slot 72 of operating body 50. Sliding sleeve 54 is rotatably and axially connected to torque arm 60 by means of bearings 52. Control stem 57 is designed to work in conjunction with cam operated locking device 79 of actuating unit 3.

Figure 13:
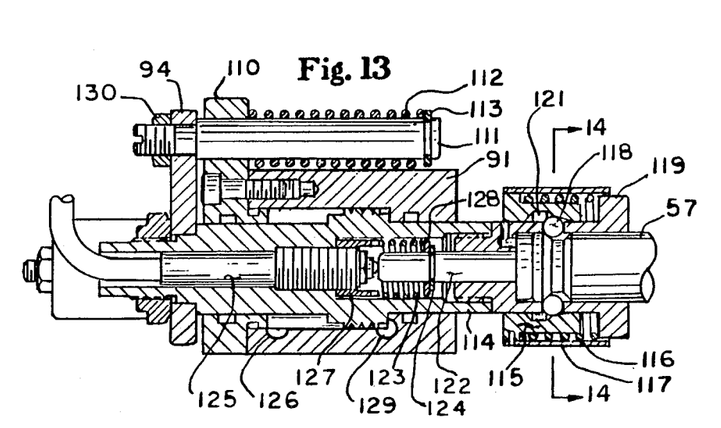
FIG. 13 is a section taken along line 13—13 of FIG. 12 showing the hydraulic piston extended.

Upon insertion of boring tool 2 in spindle 11 latch release plunger 58 is acted upon by heavier spring 123 located in servo driven actuating unit 3 shown in FIG. 13. The movement of plunger 58 causes latching lever 63 to pivot about pin 64 thereby withdrawing end of lever 63 from notch 65 of sliding sleeve 54. This permits free rotation of boring tool during machining operations. The end of control stem 57 is precisely located from gage line of the spindle taper.

Latching level assembly is protected from chips and coolant by cover 61 fastened to torque arm 60.

When the machining operations are complete, spindle 11 is oriented radially for the automatic tool changer to remove the boring tool. This orientation lines up notch 65 in sliding sleeve 54 with latching lever 63. When boring tool 2 is removed from spindle 11 plunger spring 59 acts upon snap ring 80 causing plunger 58 to pivot latching lever 63 about pin 64 causing end of lever 63 to engage in slot 65. This engagement prevents rotation thereby retaining orientation between the torque arm 60 and operating body 50 while boring tool 2 is being handled by the automatic tool changer and stored in the tool magazine.

Operating body 50 is fitted with pivot block 66 to provide a support for pivot sleeve 69 and pivot locking stud 70. Boring bar 75 is guided in pivot block 66 and retained by pivot sleeve 69. Compressable seal 81 excludes chips from pivot block assembly. Preload springs 68 causes boring bar 75 to pivot around sleeve 69 forcing bar cam groove 73 against cam bar 71. Tool block 76 is slidably mounted to end of boring bar 75 allowing for a coarse adjustment as indicated by dimension "C". Tool cartridge 77 is mounted in tool block 76 and is used for fine adjustment "C" of initial setting, usually while being preset in a tool room environment.

OPERATION

After boring tool 2 is inserted in spindle 11 and before boring operations begin a servo controlled hydraulic piston in unit 3 is advanced from its fully retracted position an amount indicated by dimension A. This movement causes the cam operating locking device 79 to lock onto the groove 82 in control stem 57 and to act on end of control stem 57 which in turn moves torque arm 60, sliding sleeve 54 and cam bar 71 to move through distance A.

The portion A of cam slot in boring bar 75 has no angle and thus the motion A of cam bar 71 does not result in any motion of tool 77.

The motion of sliding sleeve 54 causes detent balls 55 to become disengaged from detent groove 78 thus allowing free motion of sliding sleeve 54 during tool adjustment cycles.

During a production run of parts the hole being bored is measured by previously described means and an adjustment valve is transmitted to the control. The hydraulic piston assembly of servo driven actuating unit 3 is extended under the control of a servo valve. The amount of the extention is determined by the cam angle and the "length ratio" of boring bar 75.

As the hydraulic piston is extended the locking device 79 advances the control stem 57, torque arm 60 sliding sleeve 54, bearing cap 51 and cam bar 71. As cam bar 71 advances, it is guided in straight slot 72 of operating body 50 and operates in cam slot 73 of boring bar 75. The maximum travel of cam bar 71 is determined by the stroke of the hydraulic piston travel in actuating unit 3 and indicated by dimension A and B of cam slot 73. The motion of cam bar 71 causes boring bar 75 to rotate about pivot sleeve 69 through angle E therefore moving tool 77 through distance F. Distance F is the amount of correction needed to maintain bore size as tool 77 wears. During the adjustment and machining operations the preload spring 68 keeps a positive load on boring bar 75 so no looseness can be present between boring bar 75, pivot sleeve 69, and cam bar 71. The preload spring 68 also eliminates any looseness between cam bar 71 and straight slot 72 of operating body 50, thus the entire system is preloaded.

Figure 6:
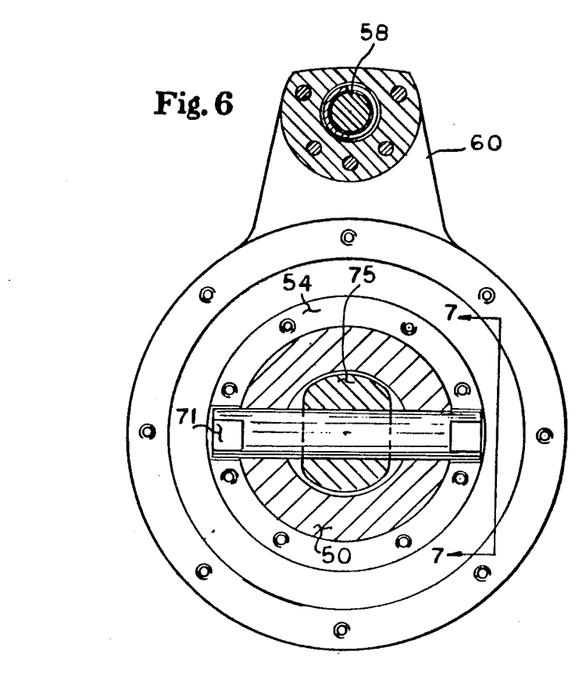
FIG. 6 is a section taken along line 6—6 of FIG. 5.

FIG. 6 is a section through boring tool 2 along cam bar 71 with bearing caps 51 and 53 removed for clarity.

Figures 7, 8, 9:
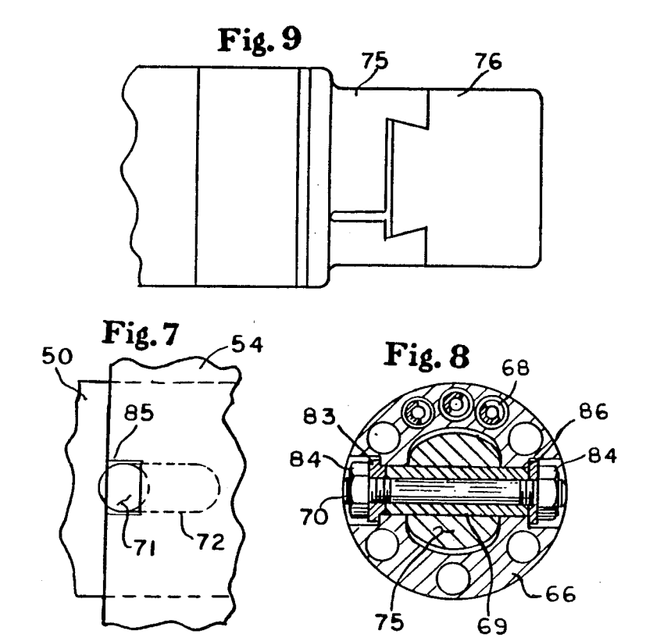
FIG. 7 is a portion of a side view of the boring tool portion of my invention taken along line 7—7 of FIG. 6.
FIG. 8 is a section taken along line 8—8 of FIG. 5.
FIG. 9 is a portion of a side view of the boring tool portion of my invention taken along line 9—9 of FIG. 5.

FIG. 7 is a side view of sliding sleeve 54 with bearings 52 and bearing caps 51 and 53 removed for the purpose of showing fit of cam bar 71 in slot 85 of slider sleeve 54. Slot 85 is wider than diameter of cam bar 71 to prevent any interference of proper fit of cam bar 71 in straight slot 72 of operating body 50. Flats on end of cam bar 71 are fit to the same dimension as depth of slot 85 so that bearing cap 51 axially clamps cam bar 71 rigidly in place.

FIG. 8 is a section through pivot block 66 showing fit of boring bar width 75 in contoured internal shapes of pivot block 66. Boring bar 75 pivots about sleeve 69. Shoulder spacer 83 is fitted to eliminate any end play between the internal dimension of pivot block 66 and width of boring bar 75. In normal machining practices end play may occur, but by fitting spacer 83 and tensioning locking stud 70 by means of washer 86 and locking nuts 84 will cause a slight deflection in pivot block 66, thus eliminating end play. A section through preload springs 68 is also shown.

FIG. 9 shows a typical dovetail joint used to lock tool block 76 to boring bar 75. This construction allows tool block 76 to be positioned with respect to boring bar 75 thus increasing the range of hole diameter a single boring bar may machine.

Figure 10:
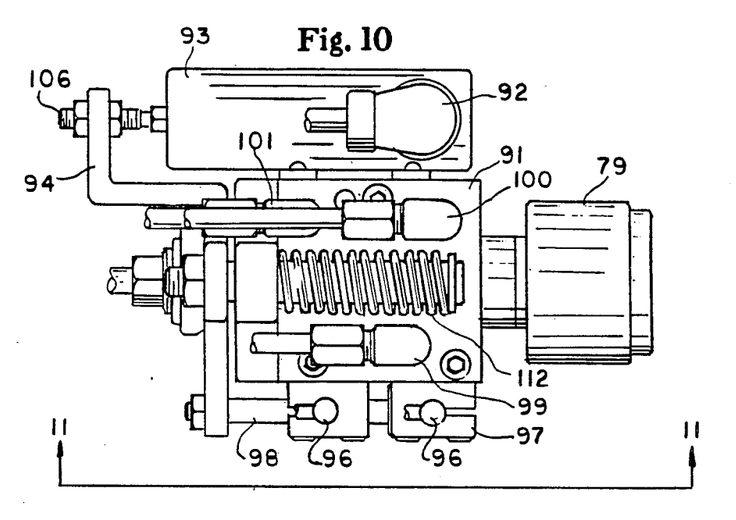
FIG. 10 is top elevation of the servo actuating portion of my invention, shown with cover removed.

FIG. 10 is a top elevation of servo actuating unit 3 with cover removed. This view shows transducer 93 mounted to cylinder housing 91. The position of transducer slider 106 is controlled by yoke 94 which is connected to hydraulic piston 114 shown in FIG. 13, also shown are hydraulic fittings 100 and 101 used to bring the hydraulic oil from the servo control system to the actuating unit. Fitting 99 is used to introduce air to the internal area of control stem locking device 79. Precision proximity limit switches 96, are used to varify extreme piston position by means of switch actuating bar 98 connected to yoke 94.

Figure 11:
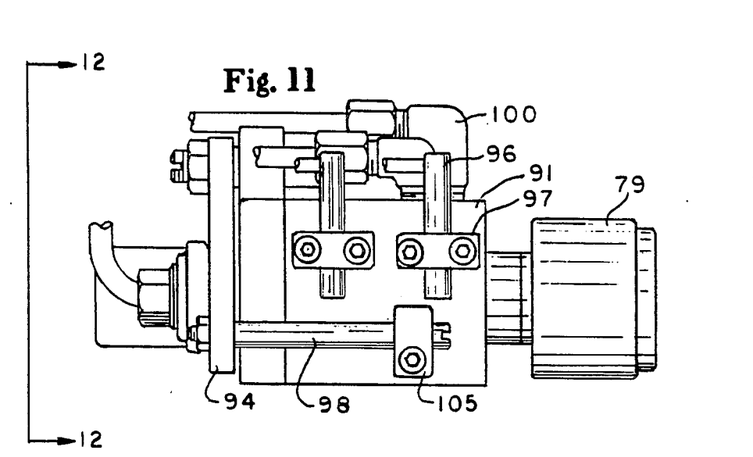
FIG. 11 is a side view taken along line 11—11 of FIG. 10.

FIG. 11 is a side view of actuating unit 3 with cover removed. This view shows proximity limit switches 96 mounted to cylinder housing 91 by means of clamp blocks 97. Limit switches 96 are actuated by switch tripping dog 105 mounted to actuating bar 98.

Figure 12:
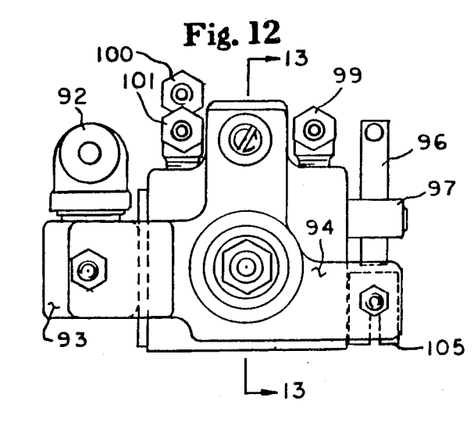
FIG. 12 is an end view taken along line 12—12 of FIG. 11.

FIG. 12 is an end view of transducer unit 3 with cover removed. This view shows the configuration of yoke 94 and the relationship of the transducer 93, hydraulic fitting 100 and 101, air fitting 99 and limit switches 96. Electrical fitting 92 is connected to transducer 93 and is used to send the position of hydraulic piston 114 to the CNC control.

FIG. 13 is a section through actuating unit 3 showing hydraulic piston 114 in the fully extended position. This position determines the maximum amount of adjustment of boring bar 2, it is also used as an initial position when used with telescoping tool adapter for surface sensing, etc. Shown attached to piston 114 is piston extension sleeve 119 having a series of radially drilled holes to locate cam locking balls 118, cam locking sleeve 115 has internal cam groove 121 which locks balls 118 in external groove 82 of control stem 57 by means of thrust from sleeve spring 116. This locking arrangement holds control stem 57 in relationship to hydraulic piston 114 during all machining operations, some of which requires the position of hydraulic piston to continue to vary. Sleeve spring 116 is protected from chips and coolant by cover 117. The head of tool present switch plunger 122 is seated against shoulder of piston sleeve 119 by insertion of control stem 57. This causes snap ring 124 to push against spring washer 128 compressing spring 123 and also to trip tool present limit switch 125 which is locked in place by lock nut 127. End cap 110 retains and supports piston 114 and also provides a guide hole for yoke orientation shaft 111 which is clamped to yoke 94 by means of lock nut 130. Yoke orientation shaft 111 also is fitted with snap ring 113 which acts against piston position spring 112 when actuating unit 3 is used with telescoping tool adapter as described earlier. Hydraulic ports 126 and 139 are used to control the flow of oil required to position hydraulic piston 114.

Figure 14:
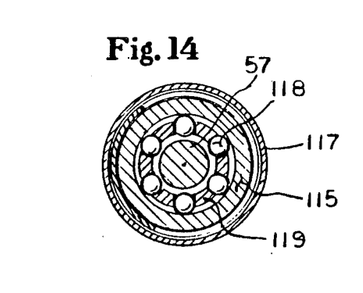
FIG. 14 is a section taken along line 14—14 of FIG. 13.

FIG. 14 shows the series of locking balls 118 located in series of holes in piston extension sleeve 119.

Figure 15:
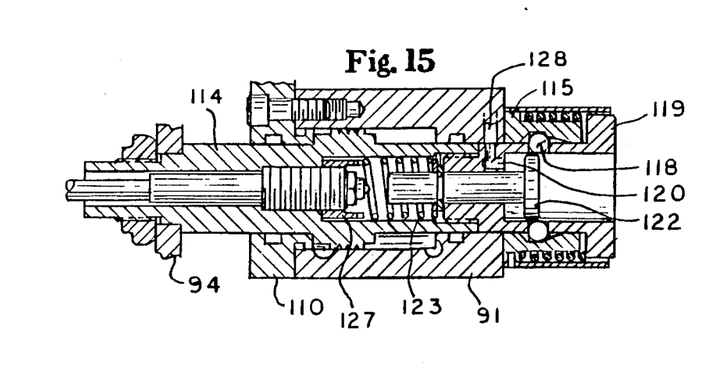
FIG. 15 is a section similar to FIG. 13 showing the hydraulic piston retracted.

In FIG. 15 I show a section similar to FIG. 13 but with the hydraulic piston 114 fully retracted. This position causes locking sleeve 115 to contact face of cylinder body 91. Sleeve 115 actually makes contact before piston 114 is fully retracted therefore sleeve spring 116 is compressed and cam groove 121 is positioned over cam balls 118 permitting them to retract, thus releasing cam locking device. FIG. 15 also shows control stem removed which allows plunger spring to position limit switch plunger 122 so head of plunger 122 is located in front of locking balls 118 preventing them from becoming disassembled from cam locking device. I also show in FIG. 15 pneumatic port 128 of cylinder body 91 lined up with port 120 in piston sleeve 119. This provides for air flow around plunger head 122 which provides a means for exclusion of chips when other machining operations are being performed by the machining center.

Figure 16:
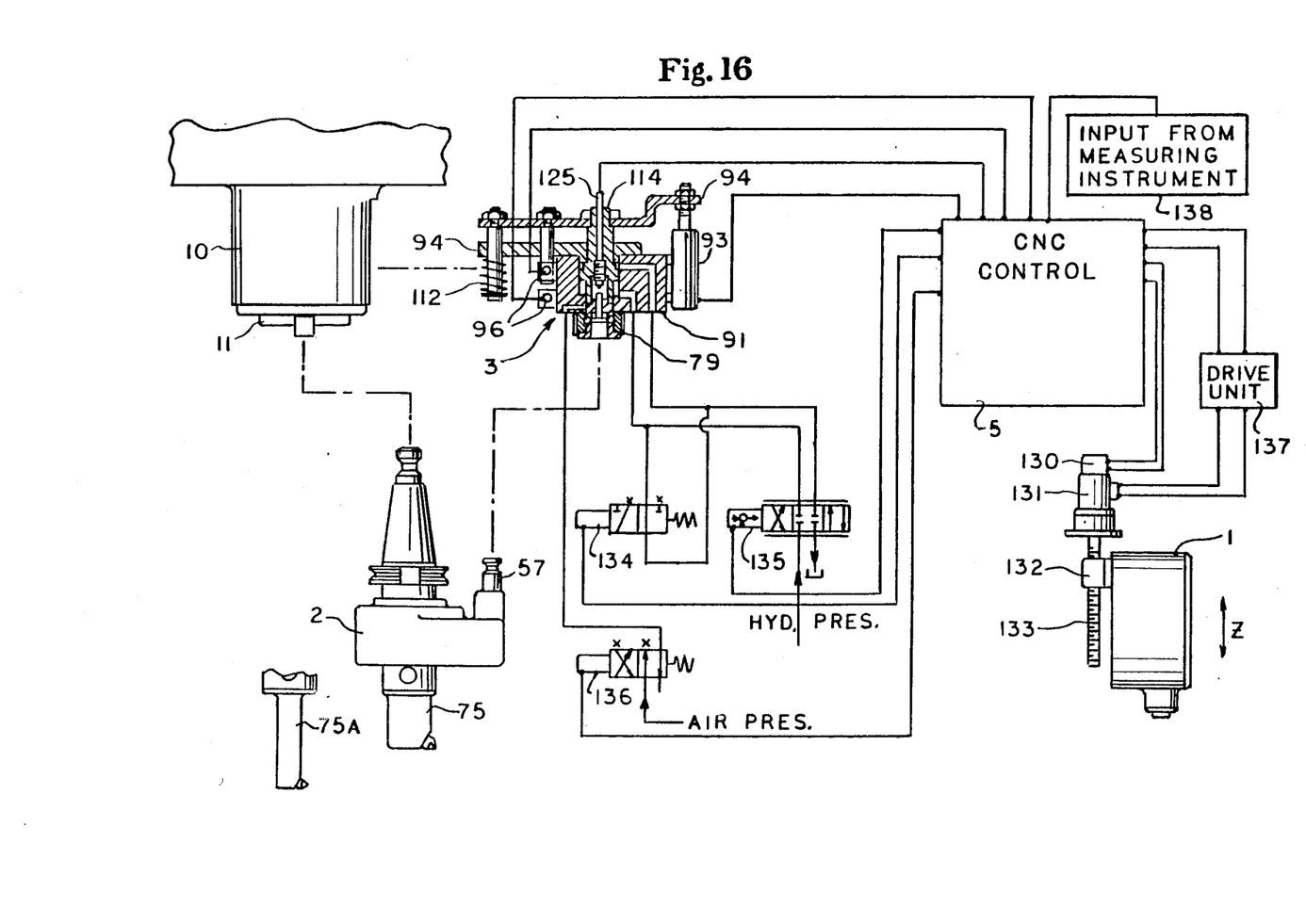
FIG. 16 is a mechanical, electrical, hydraulic and pneumatic schematic diagram of my invention.

FIG. 16 is a mechanical, electrical and pneumatic diagram showing the operational relationship of the devices described earlier.

It can be seen the insertion of automatic boring tool 2 into taper of spindle 11 will also cause insertion of plunger 57 into cam locking device 79 of actuating unit 3 which is mounted adjacent to the spindle housing 10. This insertion will trip tool present limit switch 125.

After the first hole or several holes are bored and an adjustment is necessary, hydraulic servo valve 135 which is controlled by CNC control 5 will cause hydraulic piston 114 to advance distance "A" shown in FIG. 5 plus whatever additional amount is required for tool wear compensation or errors made during presetting of boring tool. As indicated by measuring instrument input 138.

In contouring operations hydraulic servo valve 135, will cause hydraulic piston 114 to advance distance "A" and will continue to advance and retract while the headslide 1 (Z axis) is being advanced under the control of servo motor 131, feedback device 130, and precision ball screw 133 working in conjunction with ball nut 132. The phase relationship of these motions controlled by CNC control 5 determines the configuration of the contoured parts.

By-pass valve 134 is used to allow oil to flow freely between opposite ends of balanced area hydraulic piston 114 when actuating unit is used with telescoping tool adapters. In this condition piston positioning spring 112 will cause hydraulic piston 114 to be extended before telescoping tool adapter is inserted in spindle 11.

Pneumatic valve 136 is used to control air flow to the cam locking device 79 while machining center is performing operations that do not require the use of actuating unit 3.

Two different configured boring bars 75 and 75A are shown merely to indicate that a variety of boring bar configurations can be used with the main operating body of automatic boring tool 2.

I claim:

1. In a boring machine having computer numerical control and of the class having a spindle for receiving a tool to form a bored hole and a servo-driven actuating unit to control the diameter of said bored hole comprising a tapered shank adapted to be received in said spindle, a pre-loaded adjustable boring bar with a cam slot pivotally secured to said tapered shank, a non-rotating torque arm on said tapered shank, a sliding sleeve carried by said torque arm, said torque arm being controlled in its linear position relative to the tapered shank by the servo-driven actuating unit, a cam bar mounted in said sliding sleeve to be received in the cam slot in said boring bar, whereby axial movement of said cam bar in response to a setting of the serv-driven actuating unit pivots the boring bar to a preselected position to bore a hole by the boring bar.

2. The device as described in claim 1 wherein the tapered shank is provided with a plurality of springs, said springs mounted at one end of the tapered shank to resist the movement of the cam bar in the cam slot carried by said tapered shank.

3. The device as described in claim 1 wherein the boring bar is pivoted about its axis by linear movement of the cam bar within the slot in said boring bar.

4. The device as described in claim 1 wherein the servo-driven actuating unit comprises a hydraulic piston, a cylinder, said piston slidably mounted in said cylinder, a yoke mounted on said piston, a transducer actuated by the movement of said yoke whereby an electrical signal is generated by the computer numerical control device for controlling the operation of the servo-valve in said servo-driven actuating unit.

5. In the device described in claim 1 wherein the said non-rotating torque arm has a control stem with a cam groove, said control stem adapted to engage the servo-driven actuating unit, a cam locking device comprising a piston, extension sleeve, a series of radial positioned balls carried by said extension sleeve adapted to be received in said cam groove in said control stem to hold said control stem of said torque arm in locking position.

* * * * *